United States Patent
Williams, II et al.

(10) Patent No.: US 8,460,489 B2
(45) Date of Patent: Jun. 11, 2013

(54) FLEXIBLE FILM APPLICATION FOR DECORATIVE COATINGS

(75) Inventors: James B. Williams, II, Seville, OH (US); Scott M. Azzarello, Garfield Heights, OH (US); Timothy B. McGlinchy, Twinsburg, OH (US); Roger J. Eberwein, Brunswick, OH (US)

(73) Assignee: GED Integrated Solutions, Inc., Twinsburg, OH (US)

( * ) Notice: Subject to any disclaimer, the term of this patent is extended or adjusted under 35 U.S.C. 154(b) by 125 days.

(21) Appl. No.: 12/855,798

(22) Filed: Aug. 13, 2010

(65) Prior Publication Data

US 2012/0037292 A1 Feb. 16, 2012

(51) Int. Cl.
*B32B 41/00* (2006.01)
*B44C 1/00* (2006.01)

(52) U.S. Cl.
USPC ............. 156/64; 156/230; 156/233; 156/235; 156/239

(58) Field of Classification Search
USPC .............. 156/64, 230, 233, 235, 239; 700/99, 700/171, 180
See application file for complete search history.

(56) References Cited

U.S. PATENT DOCUMENTS

| | | | |
|---|---|---|---|
| 3,356,062 | A | 12/1967 | Crowe |
| 5,567,261 | A | 10/1996 | Schoetz |
| 6,059,914 | A | 5/2000 | Süss |
| 6,358,356 | B1 | 3/2002 | Bradshaw et al. |
| 6,389,782 | B1 | 5/2002 | Kinugawa et al. |
| 6,531,016 | B1 | 3/2003 | Weber et al. |
| 6,687,982 | B2 | 2/2004 | McGlinchy |
| 6,708,384 | B2 | 3/2004 | McGlinchy |
| 6,745,460 | B2 | 6/2004 | McGlinchy |
| 6,889,416 | B2 | 5/2005 | McGlinchy |
| 6,912,767 | B2 | 7/2005 | McGlinchy |
| 7,048,964 | B2 | 5/2006 | McGlinchy et al. |
| 7,296,381 | B1 | 11/2007 | McCabe et al. |
| 7,429,299 | B2 | 9/2008 | McGlinchy et al. |
| 2003/0205315 | A1* | 11/2003 | McGlinchy et al. .......... 156/247 |
| 2003/0233163 | A1* | 12/2003 | Dorsch ......................... 700/117 |
| 2004/0117967 | A1* | 6/2004 | McGlinchy ..................... 29/430 |
| 2005/0043838 | A1* | 2/2005 | Clayton et al. ................ 700/100 |
| 2005/0144090 | A1* | 6/2005 | Gadamsetty et al. .......... 705/26 |
| 2008/0083193 | A1 | 4/2008 | McGlinchy et al. |

FOREIGN PATENT DOCUMENTS

EP 1475491 11/2004

OTHER PUBLICATIONS

International Search Report (9 pages) for PCT App. PCT/US10/43622, mailing date Sep. 16, 2010.

* cited by examiner

*Primary Examiner* — George Koch
(74) *Attorney, Agent, or Firm* — Tarolli, Sundheim, Covell & Tummino LLP (57) ABSTRACT

A film application system having multiple foil application stations. Each foil application station has a support for an elongated plastic component (typically vinyl) having an input and an output side. A drive moves successive elongated components along a path through the application station from the input side to the output side as decorative foil is applied to a surface of the component. A properly positioned and oriented transfer head applies heat and pressure to the elongated film as the component moves through the application station. The disclosed system must accommodate different style and shape components corresponding to different style windows, doors, or sashes. A backing fixture that is configured to support a given configuration component is positioned to support the component as the component moves through the application station in a region of the transfer head.

11 Claims, 12 Drawing Sheets

FLEXIBLE FILM APPLICATION FOR DECORATIVE COATINGS

FIELD OF THE INVENTION

The present invention concerns decorative coatings for building components.

BACKGROUND ART

Components that make a window frame or sash are typically formed by miter cutting extruded components to size before heating the mitered ends and then pressing the heated ends together so that the melted ends bond to each other to form a four sided sash or frame. Further assembly of the window may involve installing an insulating glass "IG" unit into the sash or frame and possibly painting of the plastic that forms the sash or frame. Painting at this stage can be expensive and unnecessarily increase the cost and delivery time of the window or door to the consumer. Decorative patterns can be applied to the window frame or sash prior to cutting of the component into pieces for assembly. These decorative patterns could either be a solid color or could simulate a wood grain finish.

One prior art machine, sold by CPS Resources of Indian Trail, N.C. 28079, routes substrates such as picture frames past a flexible foil or film dispensing head. The speed of movement of the substrate matches the unwinding speed of the foil as the foil is brought into contact with the substrate. A combination of heat and pressure treatment of the foil as it contacts the substrate causes the foil to permanently adhere to the substrate. The present invention relates to improvements to this process especially as the process relates to application of decorative film or foil to window or door components that have variable profile shapes

SUMMARY

This disclosure relates to apparatus and method for applying a decorative material to specified surfaces of a component. In one application, subsequent to the application of the decorative material, the component is cut and assembled to form a window or door frame or sash. In one embodiment, multiple decorative film application stations are staged to apply a decorative foil to different surfaces of the component.

A controller in communication with each of the multiple decorative foil application stations executes a control program for coordinating feeding of the component from one station to a next subsequent station. The control program executed by the controller also changes and controls a set up of each of the multiple stations for the profile to receive the decorative material by means of an intuitive user interface.

In an exemplary embodiment, each foil application station has a support for the component (typically a vinyl lineal of a certain length) having an input and an output side. A drive moves successive elongated components along a path through the application station from the input side to the output side as a transfer foil is applied to a surface of the component. A properly positioned and oriented transfer head applies heat and pressure to the transfer foil as the component moves through the application station. The disclosed system accommodates different style and shape components corresponding to different style windows frames, sashes, or door frames. A backing fixture is configured to support a given component profile, which is positioned to support the component as the component moves through the application station in a region of the transfer head.

In the exemplary embodiment, a controller presents to a user on a computer monitor a menu of different components having different profiles for transfer foil treatment. The user chooses a particular component from the menu and the controller identifies a proper recipe for use at each of the multiple work stations.

The recipe includes one or more of the following treatment parameters: a proper choice for the heat and pressure roller at each application station, a proper backing fixture for the component as the component moves through an application station, an angle of approach for contact between the component and the a transfer head, a radial position of the transfer head with respect to an application surface of the component during movement of the component through an application station, a target speed of movement of the component through the application station, a target temperature for the roller, and a foil width for application at each of the multiple application stations. In the exemplary embodiment, the user selects and installs the roller and backing fixture and foil at each station and the controller through means of communication with each station performs automated control and/or monitoring of the other parameters.

These and other advantages and features of the invention will become better understood by reference to the accompanying more detailed description, which is described in conjunction with the accompanying drawings.

EXEMPLARY EMBODIMENT

Figure 3:
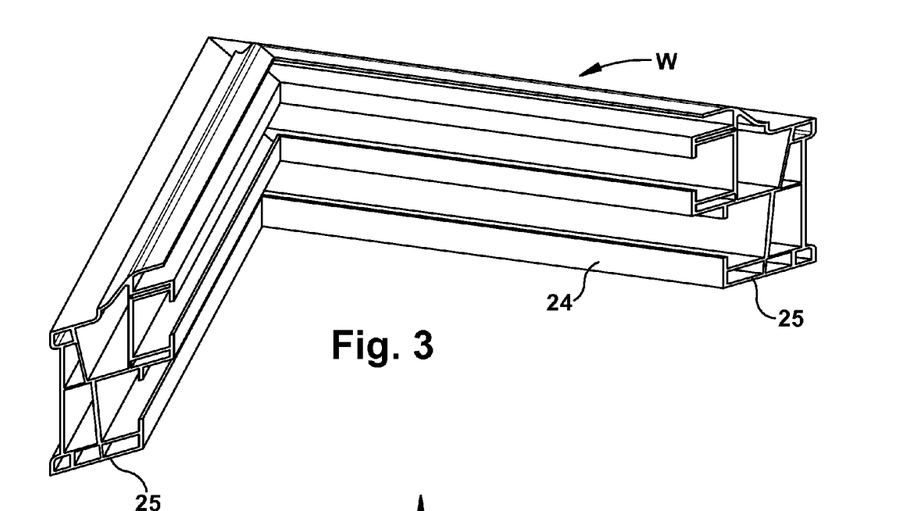
FIG. 3 is a perspective view of two abutting window parts that have been cut from a lineal and heat fused to form a window frame or sash.

The drawings depict an application system 10 for applying a transfer foil or film coating to selected surfaces of a workpiece. In one exemplary embodiment, the workpiece is a lineal 20 which is cut and that used to construct a window or door frame or sash. The system 10 applies a transfer foil F to multiple surfaces 22-25 (See FIG. 3a) of the elongated component which is then cut and assembled into a window or door such as the window frame W shown in FIG. 3. Such components are referred to herein as lineals.

Figure 1:
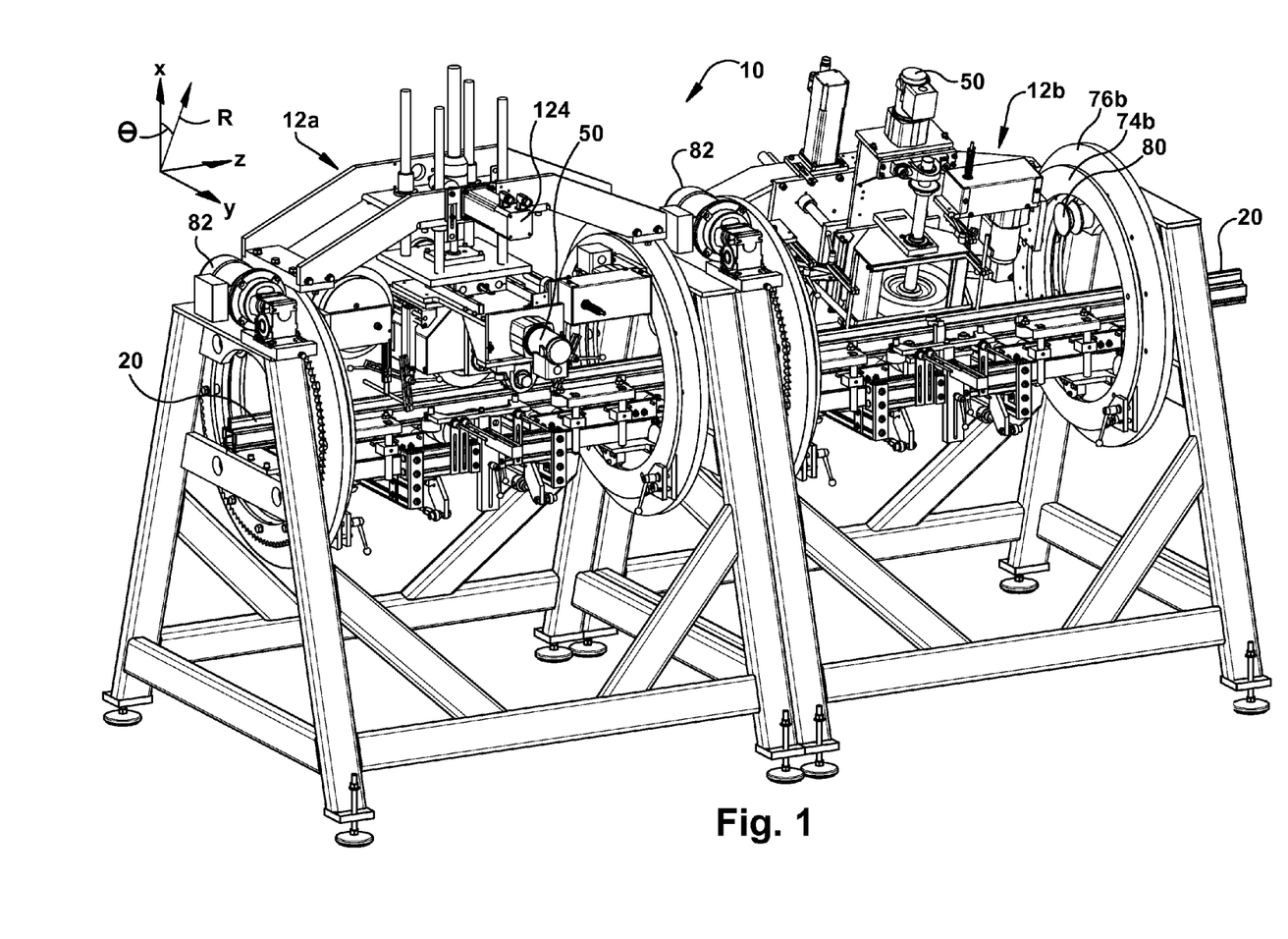
FIGS. 1 and 2 are perspective depictions of a foil application system constructed in accordance with an exemplary embodiment of the invention.
Figure 2:
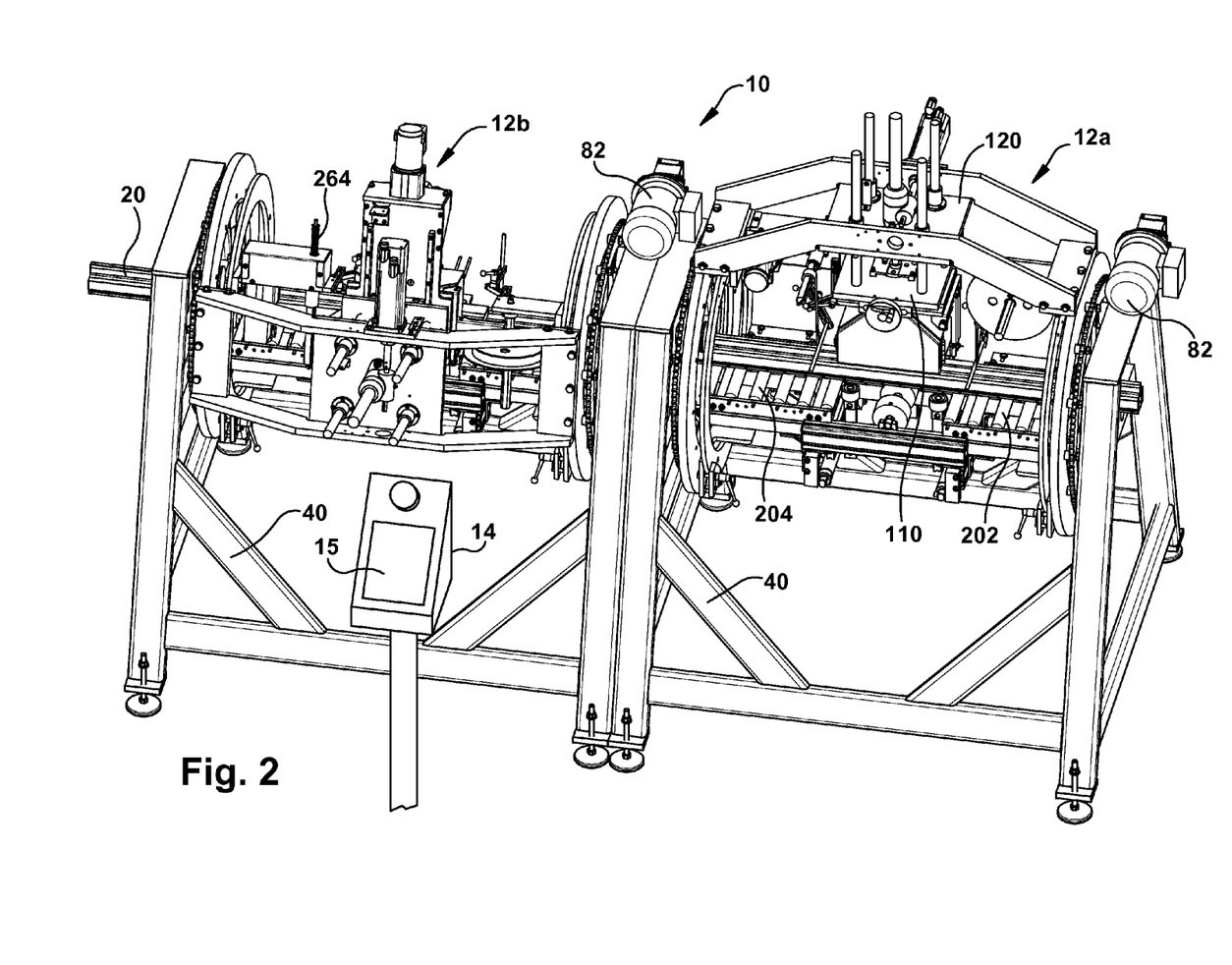
Figure 3A:
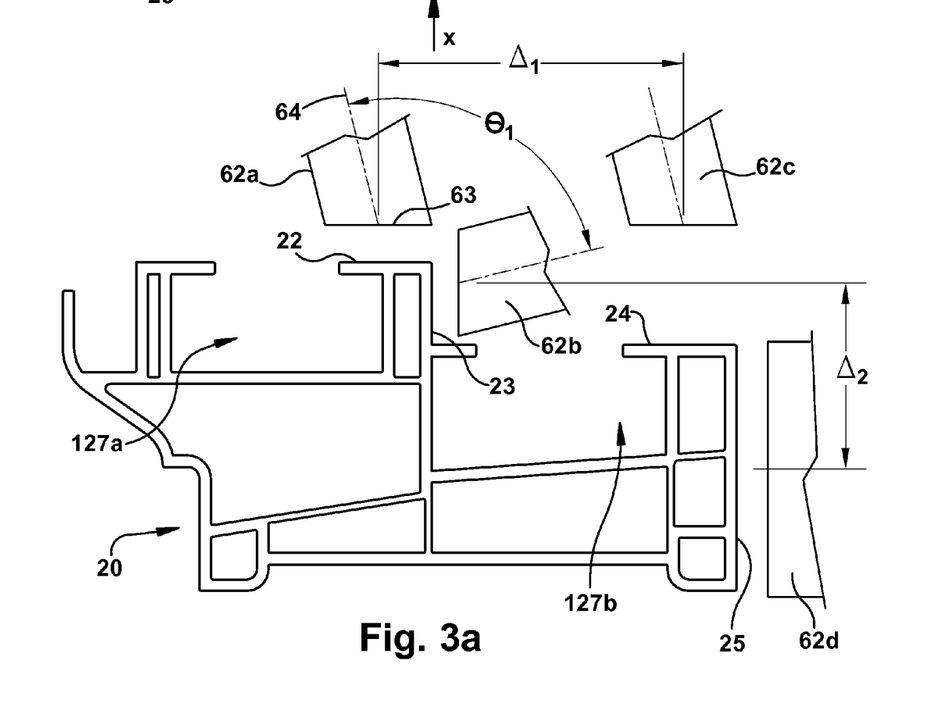
FIG. 3a is an end view of a component showing different surfaces to be treated by a transfer foil.

One Exemplary system 10 includes multiple decorative transfer foil application stations or work stations wherein each station applies a decorative transfer foil to different surfaces or regions of the lineal. In FIGS. 1 and 2, two such stations 12a, 12b are depicted. Generally, each station applies a transfer foil F to a specified exposed region of the elongated component so that each next subsequent station in a series of such stations covers a different exposed region until a desired portion of the lineal has been covered with the foil F. Turning to FIG. 3a, for example, the surfaces 22-25, of the component 20 are covered with foil F in one pass of the component or lineal through four different foil applying workstations. An untreated lineal enters the first work station and all desired surfaces have been covered when the component leaves the last work station.

Figure 12:
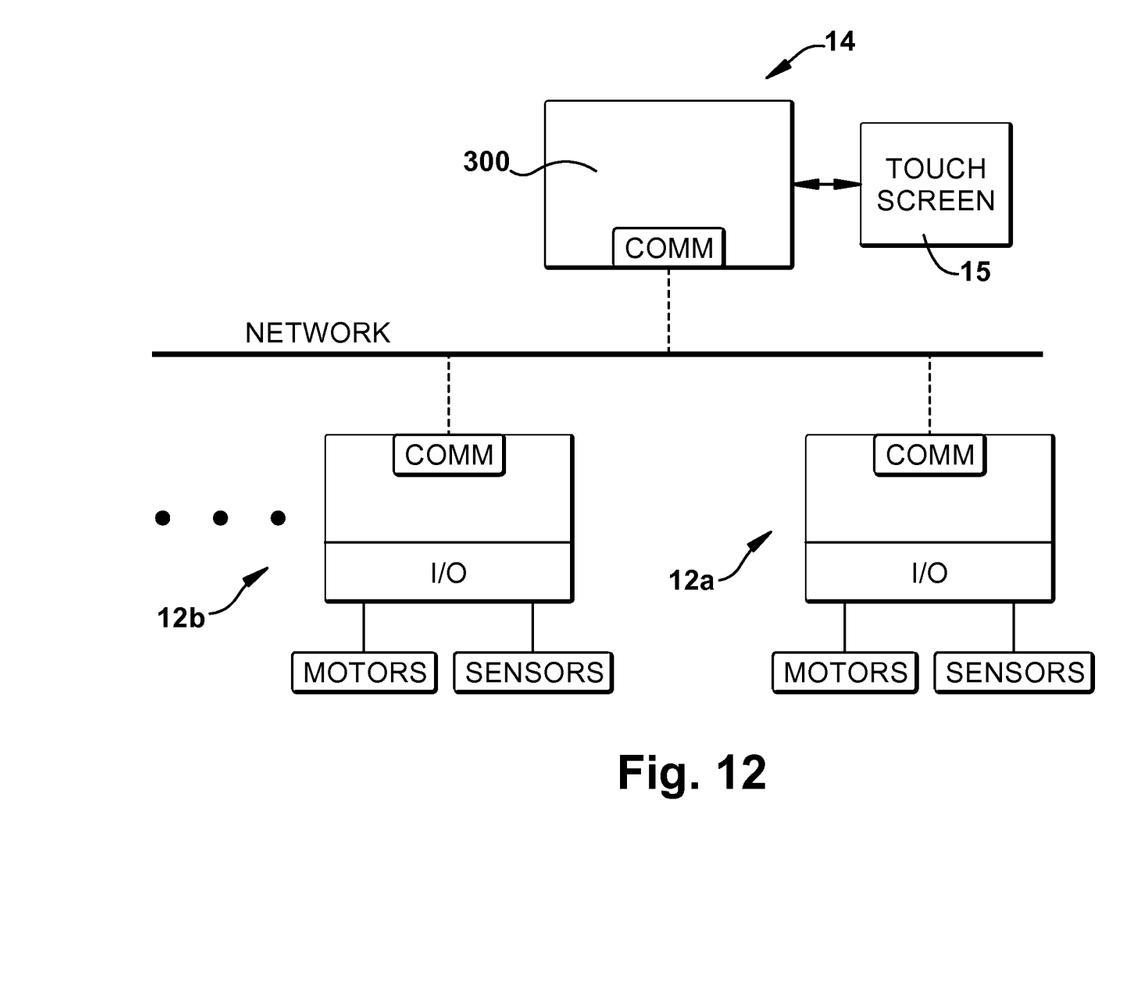
FIG. 12 is a schematic block diagram of a control system for controlling the exemplary decorative tape application system.

The multiple work stations operate under control of a control station 14. A programmable controller 300 (FIG. 12) at the control station 14 communicates with each of the work stations to control treatment of the lineal as it moves through the multiple work stations. An executable control program that runs at the control station 14 manages set up of the work stations to accommodate application of a specified width foil to different surfaces of a lineal having a specified profile at the different work stations. As discussed in more detail below, appropriate set up at each work station involves controlled movement of a transfer head 60 of the work station before the work station can accommodate a particular profile of lineal 20. As used throughout, the term "profile" means the cross sectional shape of the lineal 20 such as the shape of the end view of FIG. 3a. It should be appreciated by one skilled in the art that although only one profile is shown in FIG. 3a, a large number of different profiles may receive decorative foils on specified surfaces and indeed the flexibility to rapidly set up the system to accommodate a range of different profiles in one advantage of the exemplary system.

Figure 4:
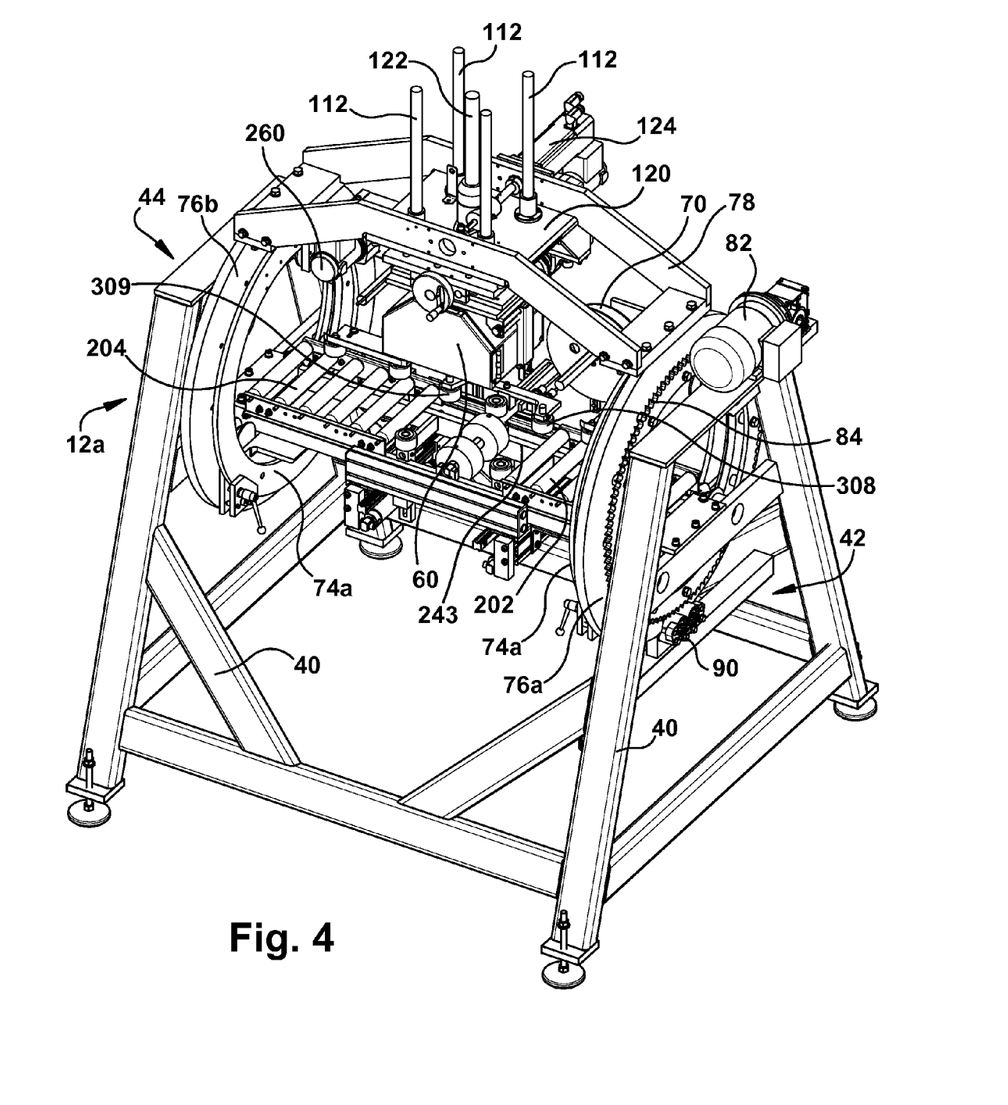
FIG. 4 is a perspective view of a single workstation for applying flexible foil to an elongated component.

A single foil application work station 12a is shown in FIG. 4 and is seen to include a support or stand 40 having an input side 42 and an output side 44. A drive 50 which in one exemplary embodiment is an electric motor moves successive lineals 20 (FIG. 2) along a generally linear path through the work station 12a from the input side to the output side as a thin layer of transfer foil F is applied to a surface of the lineal. A transfer head 60 includes a rotatably mounted drive roll 62 (FIG. 5) coupled to the drive 50. In addition to moving the elongated component, the drive roll 62 applies heat and pressure to the transfer foil F as the lineal 20 moves through the foil application station 12a from the input side 42 to the output side 44. Motive force for moving the component is applied by the roll 62 but the roll does not directly contact the component due to the presence of the transfer foil F between the drive roll and the lineal.

The exemplary foil material is an elongated multi-layer plastic film wherein one layer of the multilayer material is the decorative layer and a second layer is a backing layer B that is recoiled after application of the decorative layer to the lineal 20. Additional formulations of the foil include a cover layer and possibly a separate adhesive layer for fixing the decorative layer to the lineal 20. In a typical operation application of heat and pressure with the foil F in contact with the lineal causes the decorative layer to bond to the lineal and the backing material separates from the cover layer (if present) and is wound about a takeup roll. Suitable foils F for use with the exemplary embodiment of the invention are commercially available from CPS Resources of Indian Trail, N.C. 28079.

Lineals are extruded with a variety of different cross sectional shapes or profiles. Each of the multiple work stations e.g. 12a and 12b utilizes a backing or support fixture that is specifically designed to support the profile of a specific lineal as the lineal moves through the work station past the transfer head 60 and its drive roll 62. A typical lineal 20 can be over 20 feet in length and multiple pieces are cut from such a lineal after the material or foil F is applied. A spacing between successive drive rolls 62 at two adjacent, successive workstations is less than the length of the lineal. Therefore, before the trailing edge of a lineal moves out of driving engagement with one roll 62 (at a first workstation for example) it's leading edge passes or drivingly engages a downstream roll 62 at a next subsequent foil application workstation. A transmission between an output of the drive 50 and the roll 62 includes a slip clutch. Use of such a clutch allows the motors of the two (or more) drives to rotate at slightly different speeds so that the fastest motor determines speed of movement of the lineal.

The transfer head 60 applies film from different angles with respect to a center axis of component movement through each station. The control station 14 includes a touch sensitive input screen 15 that transmits signals to the programmable controller 300 and allows a user or operator to choose a component profile from a menu of such profiles (See FIG. 12). Examples of the head 60 (and its associated roller 62) approaching the lineal 20 from different angles is illustrated by reference to FIG. 3a. A surface 22 of the elongated component is covered at a first of multiple successive stations using roll 62a (See FIG. 3a) having a beveled outer surface 63. If the surface 22 is generally parallel to a floor on which the workstation stand 40 rests, the angular spacing or offset of a centerline 64 to the vertical (x axis in FIG. 3a) is less than 15 degrees. The beveled surface 63 of the drive roll 62a contacts a generally flat surface 22 (with of course the foil F interposed there between).

A similarly configured roll 62b is used (at a later application station) to treat the surface 23 which is seen to be oriented at a right angle with respect to the surface 22. An angle $\Theta_1$ between the centerline 64 of the roll is ninety degrees. Two other different configuration rollers 62c, 62d for treating the surfaces 24, 25 are depicted in FIG. 3a and these rollers 62c, 62d would be positioned at two additional downstream stations in the system 10. During set up of system, the user chooses an appropriate drive roll from an inventory of such rolls. The drive roll is keyed and mounts to a correspondingly keyed shaft. The shaft also supports two collars (not shown) which limit side to side movement of the drive roll along the length of the shaft after the roller is properly positioned on the shaft.

In describing the operation of the various components of the foil application stations (e.g. 12a and 12b), it is useful to define a co-ordinate system such as the co-ordinate system shown in FIG. 1. A distance along the path of travel of the elongated component is a distance along the z direction from an origin of the co-ordinate system where the component enters the first workstation 12a. A distance in a radial direction from the z axis of this system is designated as a distance R. Finally, the angular position of a location with respect to the a vertical (perpendicular to the floor the stand 40 rests upon) is referred to by an angle theta $\Theta$.

Controlling the Angle of Tape Application

Figure 6:
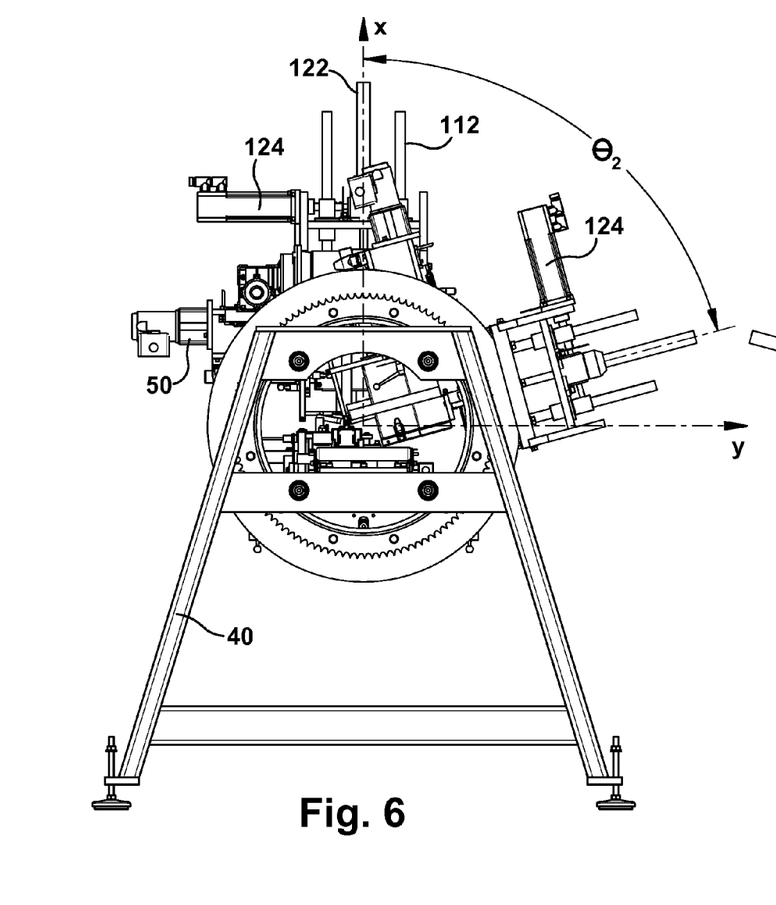
FIGS. 6 and 7 are enlarged end views of the two successive workstations for sequential treatment of elongated window parts.
Figure 7:
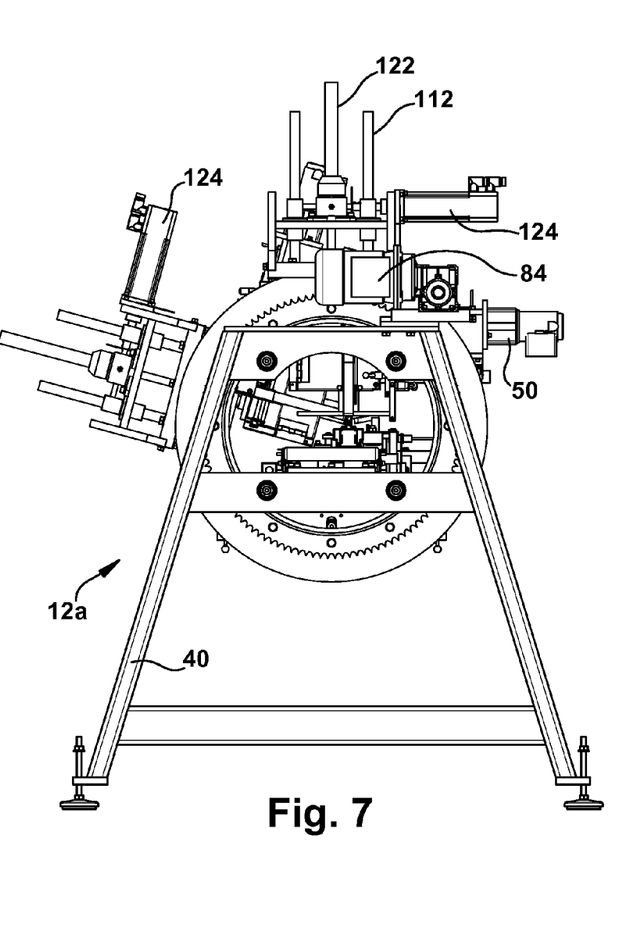
Figure 10:
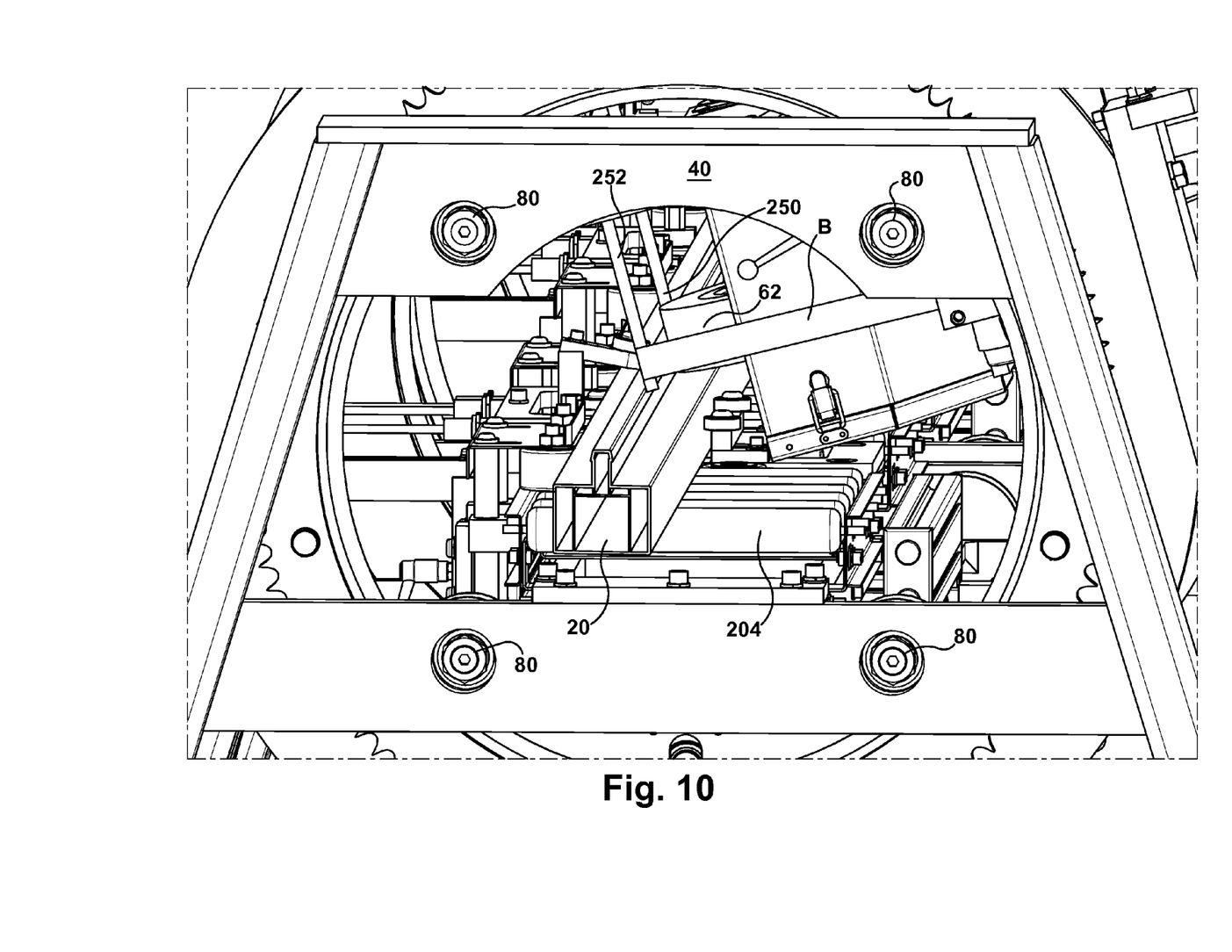

In one exemplary embodiment, a dispensing roll 70 and a take-up roll 72 are mounted to first and second rotatably mounted rings 74a, 74b. The dispensing roll 70 is mounted to a ring 74a on the input side 42 of the workstation and the take up roll is mounted to a ring 74b on the downstream or exit side 44 of the workstation. The transfer head 50 (including its pressure backing roll 62) is mounted to a cross piece 78 that extends between two larger support rings 76a, 76b rotatably supported by the stand at an input and an output of the workstation (See FIG. 4). The rings 76a, 76b are mounted to the stand 40 by means for four spaced apart cam followers 80 (See FIG. 10). A drive motor 82 supported by the stand 40 rotates the rings 76a, 76b (under control of the controller 300) to orient the transfer head 76 with respect to the path of travel the lineal follows along the z axis. As an example, the head 60 has been oriented at two different orientations spaced by an angle $\Theta_2$ at two successive work stations in the end view of FIGS. 6 and 7. The presently preferred drive 82 is an a.c electric motor having an output shaft that rotates a drive belt (not shown), which engages a circumferentially extending gear 84 connected to the ring 76a. Use of a servo drive motor is a possible alternate for use with the disclosed system for controllably rotating the rings 76a, 76b. Due to the rigid coupling together of the rings 76a, 76b by the cross piece 78 the rings 76a, 76b rotate together whenever the motor 82 is energized.

During set up of the application system 10, the controller instructs the operator regarding relative positioning of the smaller, inner rings 74a, 74b relative to the outer support rings 76a, 76b. In many applications, the rings 74a, 74b are oriented so that the foil unwinds from the supply, passes into engagement with the roller 62 and the backing is rewound all within the same plane as the roller 62 with no angular offset. Other set ups for different component profiles require relative angular offset of one or both of the supply 70 and take up 72 rolls with respect to the head 60 and its drive roller 62. This angular offset of the coil and roll can be up to 45 degrees. As a specific example, the transfer head is oriented directly above the lineal passing through the work station and both the ring 74a on the input side supporting the dispensing roll and the ring 74b on the output side support the take up roll are rotated in a counterclockwise sense as seen in FIG. 4 by an angle of 30 degrees.

To re-orient (if needed) the rings 74a, 74b (and attached rolls) with respect to their support rings 76a, 76b the user releases a brake 85 comprising a plate carried by the ring 76a (for example) by loosening a lever arm 86 which lessens the frictional contact between the brake and the ring 74a (for example). The inner rings 74a, 74b are mounted to their respective outer rings 76a, 76b by bearings which allow relative rotation of the ring 74a (for example) with respect to the ring 76a. Once an appropriate angular offset is set by the user rotating the ring 74a for example, the user retightens the brake 85. Note, in one orientation wherein the rolls and drive roller are essentially co-planer (most common) a pin slips into aligned holes on the rings 76a, 74a (not shown) to supplement the action of the brake 85 In all situations, the rings 74a, 74b are fixed to their respective support rings 76a, 76b when the motor 82 is actuated to rotate the head 60. In one exemplary embodiment, the system 10 has a automatic brake 90 supported by the stand 40 for stopping the rotation of the ring 76 in response to the controller 300 to lock the rings 76a, 76b in relation to the stand. ve to each other once they have been properly oriented during set up of the system. The exemplary brake 90 is a commercially available brake having a pneumatically actuated brake shoe and is sold by Talamatic.

Radial in and Out Movement of the Transfer Head

The transfer head 60 is mounted to a generally planar support plate 110 (FIG. 5) for radial movement in and out with respect to the z axis. The plate 110 is coupled to four linear shafts 112 which pass through bearings supported by a generally plate 120 supported by the cross piece 78 a fixed distance from the z axis or path of lineal travel. In and out radial movement of the transfer head is achieved by changing a separation of the two plates 110, 120 indicated by the arrow 121 in FIG. 5.

Mounted to the radially fixed plate 120 is a mechanical jack screw 122 having a shaft that connects to the support plate 110. An electric motor 124 has an output coupled by means of a coupling to the jack screw 122 for relative radial movement of the support plate 110 with respect to the radially fixed plate 120. The distance separation between the two plates 110, 120 varies depending on the profile of the lineal 20. The controller 300 is programmed with the correct distance or separation for each of the transfer heads of the multiple workstations so that for a given lineal 20 the setup of this spacing is accomplished in an automated fashion by sending appropriate energization signals to the various motors for controlled radial position of the head 60.

Side to Side Movement of the Transfer Head.

The drive roll 62 is mounted for rotation about an axis 126 (See FIG. 8) transverse to the z axis and which changes depending on what surface of the lineal is to be treated with foil. In some applications it is necessary to move the tangential position of the roll 62. This need is illustrated in the schematic depiction of FIG. 3b which shows a lineal suitable for fabrication into a double hung window frame supporting two sashes in gaps or channels 127a, 127b. Consider the two pressure rolls 62a, 62c depicted in FIG. 3b. The first roll 62a presses the foil F against a generally planar surface 22 of the lineal 20 and has a beveled outer surface for pressing the foil against that surface. Now consider the roll 62c. This roll (supported at a different work station from the roll 62a) also has a beveled surface for pressing the foil against a conforming surface 24 of the lineal 20. An axis of rotation for the two rollers 62a, 62c are similarly oriented as determined by the angular rotation of the head about the z axis. The plane in which the two rollers 62a, 62c rotate, however, is offset by distance delta $\Delta_1$. This offset is achieved by moving one of the rolls 62c, 62d with respect to a nominal position for the roller. In a similar way, it is seen that the plane of rotation of the two rollers 62b, 62d are offset by a distance $\Delta_2$. (Note, these two rollers also indicate the need for an different angular offset of the transfer head for different treatment surfaces)

Figure 5:
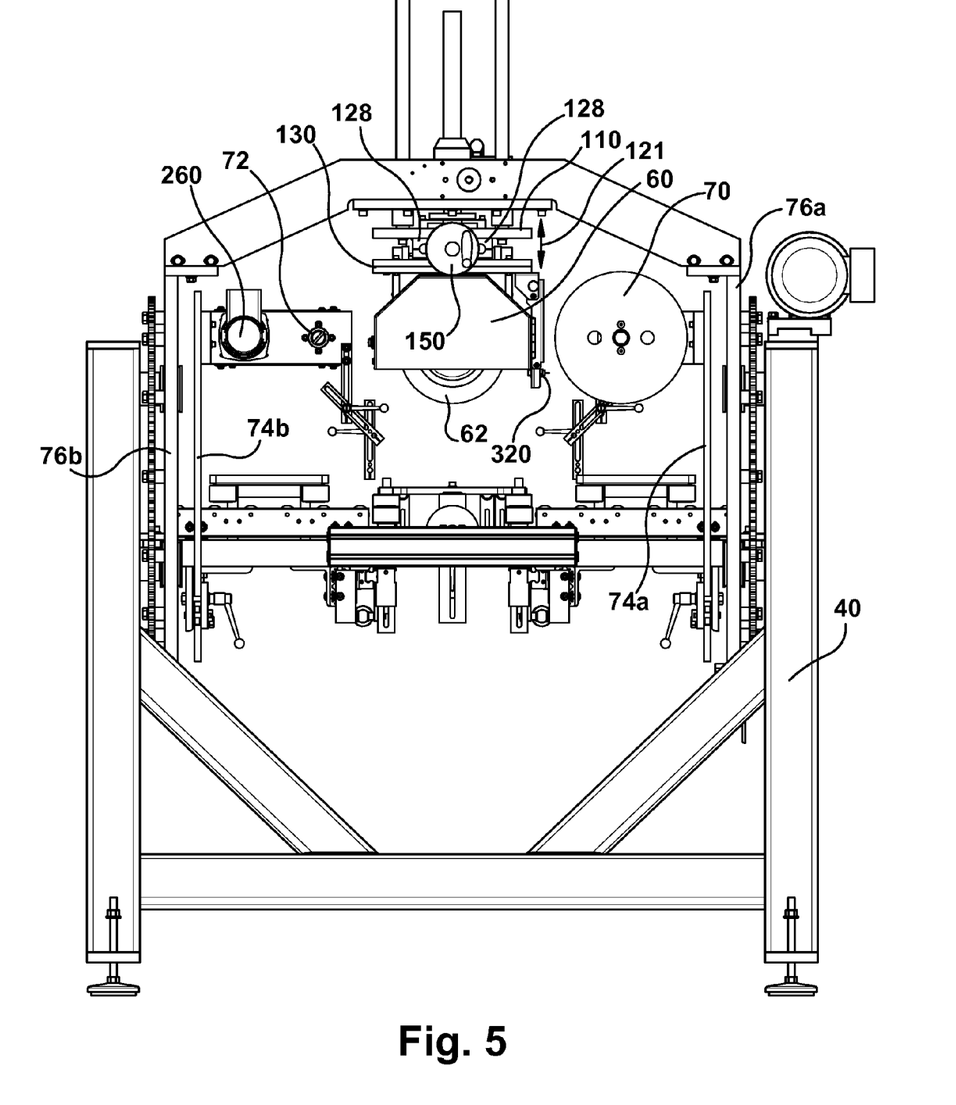
FIG. 5 is an enlarged side view of the workstation of FIG. 4.
Figure 8:
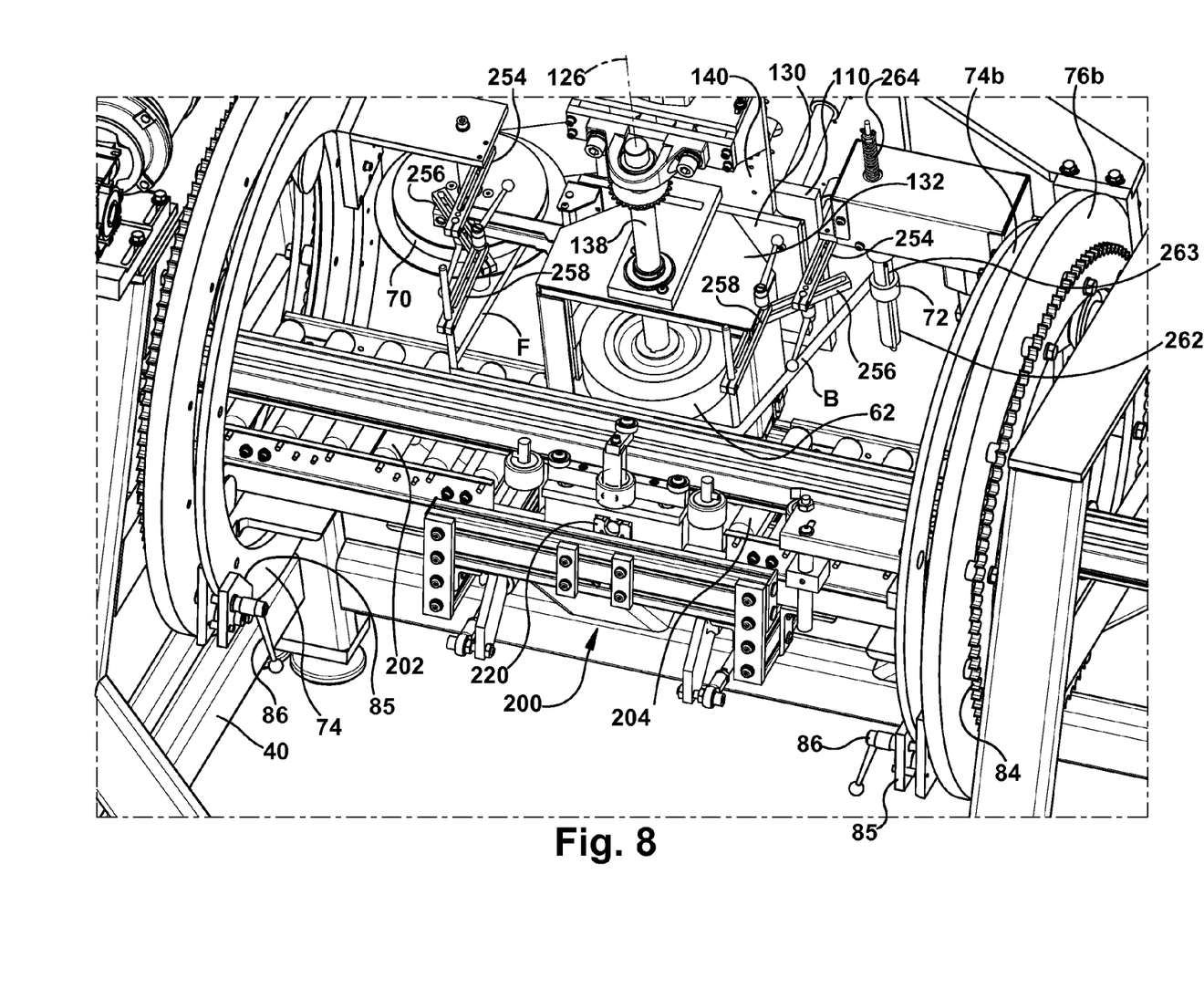
FIGS. 8-10 are perspective views of a single workstation shown a tape or foil application zone or region in greater detail.
Figure 9:
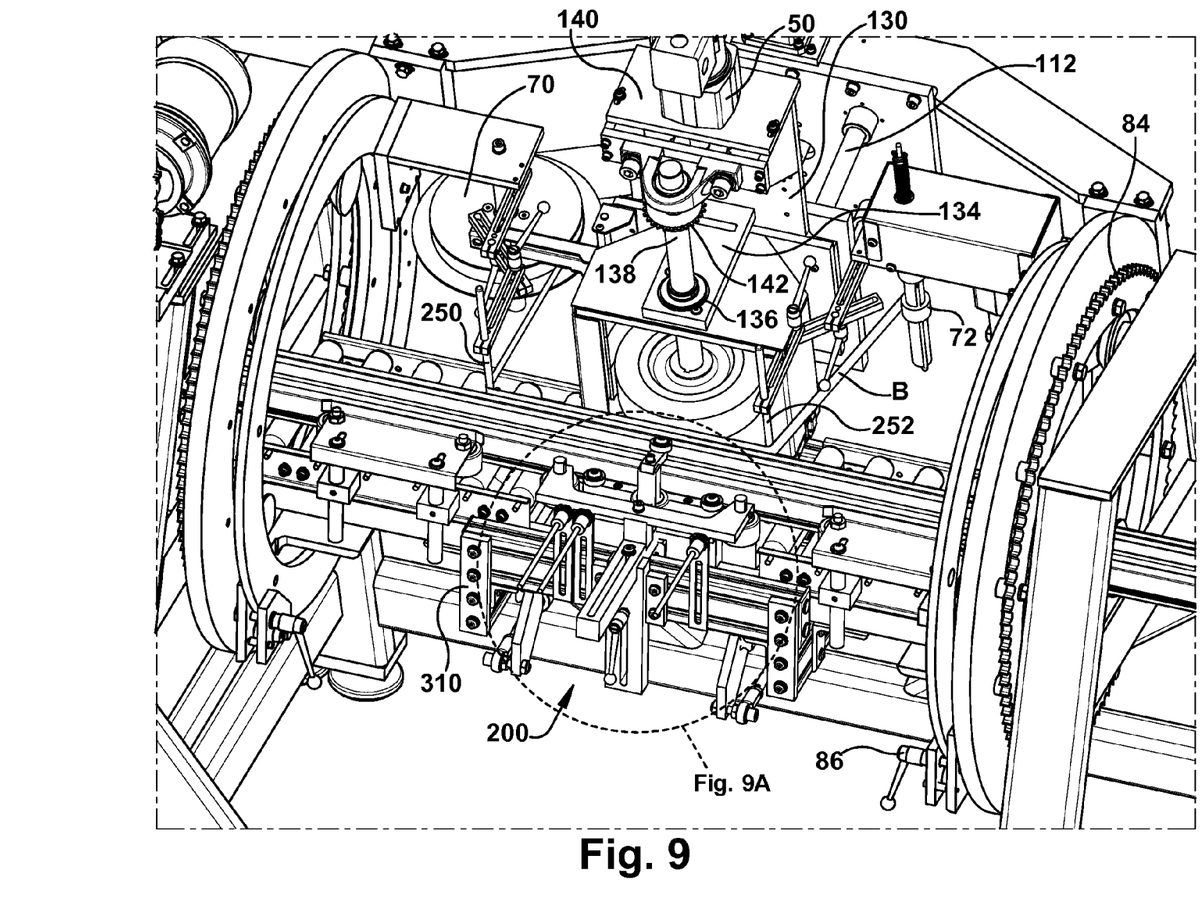
Figure 9A:
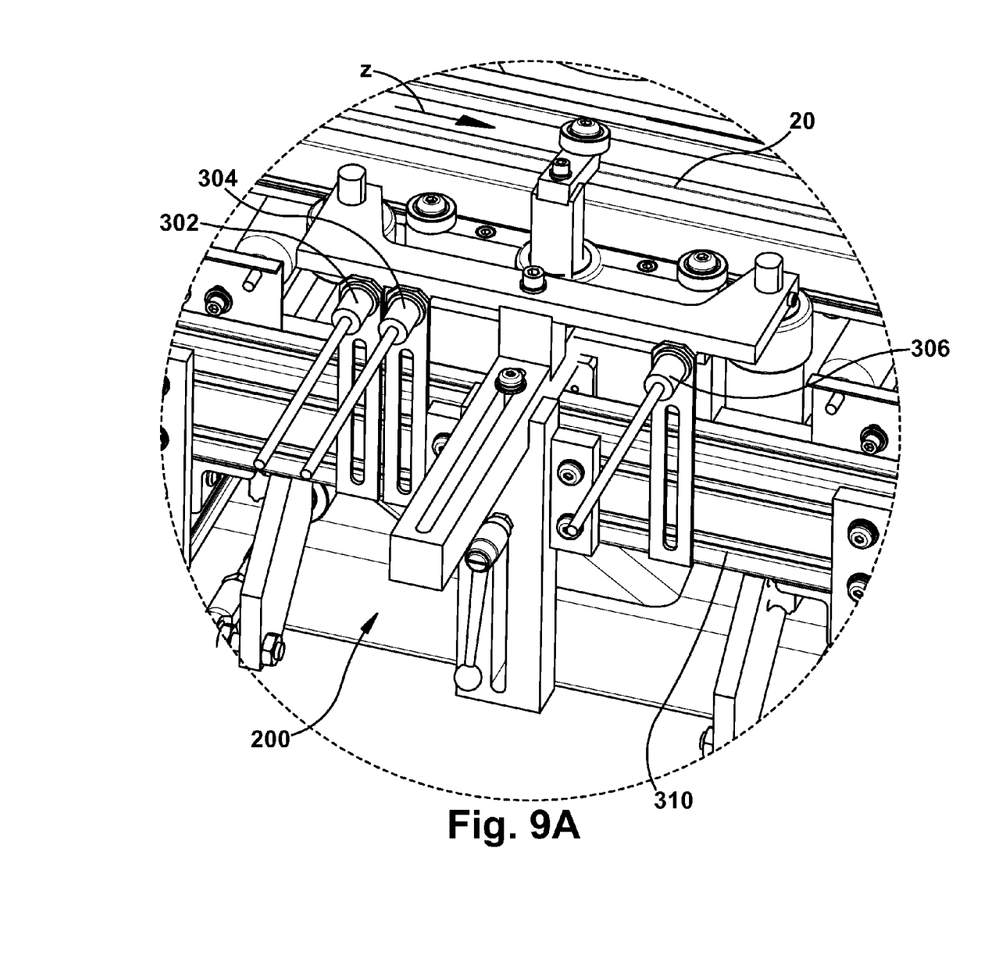
FIG. 9A is an enlarged perspective view of the foil application region of FIG. 9.

To achieve such side shifting of the roll, the plate 110 includes two side by side linear rails or bearings 128 that support an insulating plate 130 supported by those bearings (See FIG. 5). The plate 130 moves in a linear path with respect to the plate 110. As seen in FIGS. 8 and 9, a housing or oven 132 partially encloses the roller 62. A flange 134 supports a bearing 136, which supports a roller drive shaft 138 for rotation. During set up of a workstation an appropriately configured roller 62 (in a preferred embodiment constructed from silicone) for a particular lineal having a particular profile is attached to the roller drive shaft 138. A motor mounting plate 140 is coupled to the plate 130 and supports the drive motor 50. An output shaft (not shown) of the motor is coupled by means of a drive belt to a gear 142 attached to the roller drive shaft, as shown in FIG. 9.

In the present example, side shifting of the oven 132, roller 62 and drive 50 is achieved by a user rotating a manual crank 150. Rotation of the crank in one sense moves the roller 62 in one direction and rotation in an opposite sense moves the roller in an opposite direction. In the exemplary embodiment the hand crank 150 is coupled to a ball screw drive having acme threads. In an alternate example embodiment, side shifting is achieved by a motor/servo drive directed by the controller 300.

Backing Fixtures

The enlarged depictions of FIGS. 8, 9, 9A, and 10 illustrate a foil transfer zone or region 200. The foil F and the elongated component or lineal 20 enter this zone and come in contact with each other as the roll 62 applies pressure and heat to transfer a decorative layer of the foil F to a surface of the lineal 20. Before making contact with the foil F in the transfer zone, the lineal 20 is supported by a series of parallel, generally horizontal entrance rolls 202. After transfer of the decorative layer to an appropriate surface of the lineal 20, the lineal is supported by a series of parallel, generally horizontal exit rolls 204. In between these rolls, in a region of transfer each workstation includes a specially configured backing fixture.

Figure 11A:
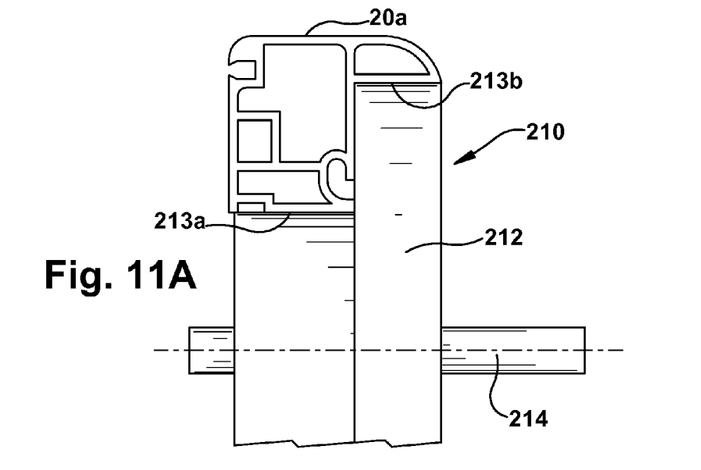
FIGS. 11a and 11b are schematic depictions showing alternate backing fixtures for use with different configuration profiles of the elongated window or door components.
Figure 11B:
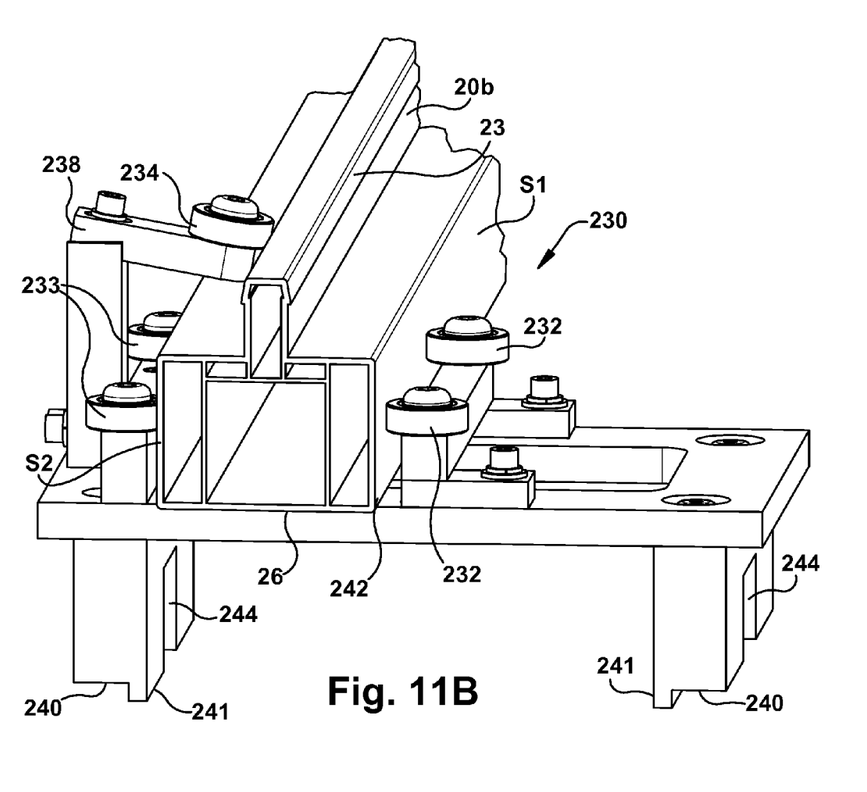

The exemplary system 10 can accommodate many different configuration lineal profiles. FIGS. 11A and 11B depict two end views of lineals 20a, 20b having different shapes. In addition to requiring different configuration rolls 62, the variety of different shaped lineals must be adequately supported and guided in the transfer region 200 as foil is pressed against a surface of the lineal to be treated. FIGS. 11A and 11B depict two different backing fixtures 210, 230 that support and guide the lineals 20a, 20b. Note, each of the multiple stations 12a, 12b etc through which the lineal moves has its own backing fixture, which are not necessarily the same from one work station to the next.

A first backing fixture 210 (FIG. 11A) includes a stepped backing roll 212 having two different diameter outer lineal support surfaces 213a, 213b. The stepped roll 212 is coupled to an axle 214 having a length to fit in and be rotatably supported by trunnion bearings 220 (FIG. 8) mounted to the stand 40 on opposite sides of the transfer region or zone 200. During set up of the workstation, the controller 300 displays to the user a number (perhaps hundreds) of lineals by a designation and then prompts a user to select from an inventory of backing fixtures and rollers 62 so that an appropriate combination of roller and backing fixture is used at each work station 12a, 12b etc. In an instance in which the fixture 210 of FIG. 11A is appropriate, the user fits the axle 214 into the bearings 220 so that the desired lineal of the many possible profiles can pass through the zone 200 in contact with the backing fixture in a manner depicted in FIG. 11A.

The backing fixture 230 is specially configured for a lineal 20b having a flat surface 26 spaced away from the roller 62. The lineal 20b enters the zone 200 supported by the entrance rolls 202 and passes through the backing fixture 230 and in particular passes over two flat support surfaces 242 of the fixture that define a spacing to appropriately position a top of the lineal for contact with the pressure roller 62. A first pair of sidewall guide rollers 232 engage one side wall S1 of the lineal and an opposite pair of side guide rollers 233 engage an opposite side wall S2 of the lineal. An additional guide roller 234 engages a surface of the lineal from one side. The side to side spacing of the rollers 232, 233 is adjustable so that the fixture can accommodate different width lineals. The angle of an arm 238 that supports the roller 234 is also adjustable to contact the lineal at different angles.

During set up, the fixture 230 is placed by an operator into a rectangular gap or space between the entrance and exit rollers 202, 204. Four guides 241 fit down into this gap so that four downwardly facing surfaces 240 of the fixture abut a parametrically extending rectangular border or ledge 243 that surrounds the rectangular gap and which is defined by the stand 40. (See FIG. 4) The position along the z axis of the fixture is determined by two notches 244 formed in the guides that have a width that fits over the trunnion bearings 220 on opposite sides of the lineal path of travel. No special tools are need for either of the fixtures 210, 230. The user lifts an existing fixture out of the way, obtains an appropriate next fixture from a stock or inventory of such fixtures and slips it into place by placing a support axle 214 into the trunion 220 or slipping the fixture into a position defined by the notch 244.

Foil Guides

As depicted most clearly in FIGS. 8 and 9, the foil F is routed from the supply roll 70 to the takeup roll 72 and through the transfer zone by elongated guide shafts 250, 252 properly angled and positioned with respect to the roller 62. Before the roller 62 is moved radially into contact with the foil, these shafts 250, 252 guide the foil F in a path through the transfer zone. An entrance guide shaft 250 is positioned to divert the foil F in its path from the supply roll and route the backing B to the second or exit guide shaft 252. During set up of the workstation, a user or operator positions the guide shafts by proper positioning of three clamps 254, 256, 258 that are supported by an appropriate one of the two rings 74a, 74b. Proper set up results in the foil passing along a path that is generally parallel to the surface which the decorative layer of the foil F is designed to treat once the lineal is pushed into the transfer zone. As the lineal 20 approaches the transfer zone, the motor 124 is actuated to bring the roller into engagement with the foil. Once the foil is trapped between the roller 62 and the lineal the frictional engagement causes the foil to unwind from the supply. As the lineal moves through the transfers region, the take up roll 72 is rotated by a motor 260 coupled to a spindle 262 that supports the takeup roll. The spindle 262 supports an elongated clamp 263 extending along its length to allow an end of the backing layer B to be secured to the shaft or spindle 262 and hand wound a sufficient amount to connect the foil to the take up roll. When not being rotated by the motor 260 a spring tensioner 264 maintains tension in the backing material.

Sensors

A controller 300 (FIG. 12) at the control station 14 monitors a number of different sensor inputs and controls a status of a number of different motors during operation of the system 10. Multiple optical sensors 302, 304, 306 are mounted to a fence 310 for monitoring a presence or absence of a lineal at the transfer zone. Other sensors monitor the temperature of a heater supported within the oven 132 and the temperature of the roll 62. During startup of the treatment of a succession of multiple lineals, a user or operator inserts a first lineal into a first workstation such as the station 12a. The appropriate position of the lineal is clear to the user due to the presence of a fixture having a gap to accept the lineal. No motive force is applied to the lineal until the head is moved into engagement with the lineal. The first two sensors or switches 302, 304 signal the controller when the lineal moves into the transfer zone 200. The sensors or switches 302,304 are located on the infeed side of the station and the switch 306 is on the exit side. One switch 302 causes the controller to bring in a horizontal roller clamp 308 into contact with the lineal prior to the lineal entering the heated roller zone. A second switch 304 brings the heated roller down to make contact with the lineal. Once the lineal moves forward through the transfer zone, its presence will trip the third switch 306 which will bring in a second horizontal roller clamp 309 into contact with the side of the lineal to keep its movement stable as it exits the machine. Once the trailing end of the profile passes the switch 302 and the second switch 304 the $1^{st}$ clamp and the heated roller will retract. When the trailing end passes the third switch 306, the roller clamp 309 is retracted. The horizontal clamps 308, 309 are only used when there are no custom backing fixtures in place at the station.

Successive lineals are maintained in abutting relation as they are placed in succession into the first workstation 12a. Retraction of the head that rotates the roller 62 occurs when it is determined that a trailing edge of the lineal has passes a third sensor 306 and no lineal is sensed by the sensor 302.

The oven has resistance heaters mounted in its walls that when energized with appropriate voltages reach a temperature of up to 1100 degrees F. These heating element's radiate heat toward the roller 62 and more particularly cause the roller to reach a temperature of from 450 to 600 degrees F. Thermocouple sensors inside the oven monitor the temperature of the heating elements. An IR sensor 320 mounted to the outside of the oven monitors the temperature of the roller 62 to maintain the roller at a set point temperature or temperature range and further to prevent damage to the roller due to overheating. The controller 300 modulates activation of the heating elements to cause the sensed temperature of the roller to be maintained at or near a target temperature. The heating elements supported within the oven are commercially available heating elements obtained from Watlow Electric of St. Louis, Mo. In one embodiment, the system 10 includes a width monitoring ultrasonic sensor commercially available from Banner as part number S18UUARQ to warn a user when the foil F is not an appropriate width for the lineal surface being treated or covered.

In the illustrated system a window or door lineal is typically extruded vinyl and may includes a center or middle channel/track used to support a window sash or door assembly. However, the component or lineal as now defined and used throughout both the specification and claims, also includes any size or shape window, door, or part forming the window, door, or supporting track assembly, including but not limited to, stiles, rails, tracks, frames, jambs, headers, sills, and channels on both interior and exterior sides of the window or door without departing from the spirit and scope of the claimed disclosure. In addition, the material composition forming the component is not limited to vinyl, but could be any type of material, including without limitation, metal, plastic, fiberglass, polymeric composition, or naturally existing material. Further the surface of the component could be cleaned or treated, for example with a sealant or painted prior to use by an applicator assembly constructed in any of the example embodiments of the present disclosure. It is within the spirit of the present claimed disclosure that the numerous uses of the term "component or lineal", whether in singular or plural form throughout the various example embodiments of applicator assemblies herein embrace the full scope of the aforementioned definition.

The exemplary system has been described with a degree of particularity. It is the intent, however, the invention include all modifications and alternations from the disclosed design falling within the spirit or scope of the appended claims.

The invention claimed is:

1. A method for applying a decorative material to an elongated building component comprising:
   a) positioning multiple decorative film application stations for sequentially applying a decorative film to different application surfaces of a choice of multiple different profile elongated building components as a selected one of the multiple different building components moves from one station to a next subsequent station;
   b) wherein each film application station comprises a drive roller for moving elongated building components along a path through the film application station and for applying heat and pressure to a decorative layer of an elongated film as the elongated building component moves through the film application station;
   c) providing a support for a removably located backing fixture for supporting the building component, said backing fixture having a shape based on a configuration of the elongated building component as the elongated building component moves through the multiple decorative film application stations;
   d) presenting a user interface on a viewing monitor which allows a user to choose from a menu of different elongated building components during a set up of said multiple decorative film application stations; and
   e) in response to a user choice of the building component, prompting the user to install a proper combination of a removably located backing fixture and drive roller for use at each of the multiple film application stations based on a particular building component chosen by said user.

2. The method of claim 1 wherein each film application station includes a transfer head that supports a drive roller for applying heat and pressure and further comprising:
   mounting the transfer head to a moveable carriage; and
   rotating the carriage and supported transfer head with a motor to an appropriate orientation with respect to a path of travel of the elongated component; and
   while maintaining the carriage at the appropriate orientation applying heat and pressure to a film contacting an appropriate application surface of the elongated building component by moving the head and supported drive roller into a heat and pressure applying position.

3. The method of claim 2 wherein the transfer head comprises a film dispensing roll for conveying a decorative film to a region of contact with the building component and a take up roll for coiling a film backing once a decorative layer of the film has been applied to the building component and wherein at least one of the film dispensing and take-up rolls are mounted to a first carriage and the drive roll is mounted to a second carriage which is moveable with respect to the first carriage.

4. The method of claim 3 wherein the first and second carriage are fixed in position with respect to each other by a brake which operates under the control of a controller.

5. The method of claim 1 additionally comprising monitoring a width of the film and informing a user by means of the user interface if the film has an inappropriate width at any of the multiple film application stations.

6. The method of claim 1 wherein a controller coupled to the viewing monitor presents a menu of different building components having different profiles and wherein the controller responds to user selection of a particular building component by additionally identifying for the user one or more of the following parameters:
   i) an angle of approach for contact between the building component and the drive roller when applying decorative film to a specific application surface at a specific application station,
   ii) a radial position of the drive roller to properly apply pressure to an application surface of the component during movement of the component through an application station,
   iii) a target speed of movement of the component through the application station,
   iv) a target temperature for the drive roller, and
   v) a proper film width for application at each of the multiple application stations.

7. The method of claim 1 wherein after setup by the user based on the prompting, one or more elongated building components are treated with film as said one or more elongated building components move through the multiple decorative film application stations.

8. The method of claim 1 further comprising positioning said removably located backing fixture into a universal receiving fixture common to all the multiple decorative film application stations.

9. The method of claim 8 wherein the universal receiving fixture comprises a bearing for locating a backing fixture, the bearing being positioned within the universal receiving fixture such that it can be adapted to a specific backing fixture chosen from a plurality of backing fixtures used to support varying elongated component profiles.

10. The method of claim 1 wherein each film application station includes a transfer head that supports a drive roller that applies heat and pressure and further comprising:

mounting the transfer head to a moveable carriage; and rotating the carriage and supported transfer head with a motor to an appropriate orientation along a curved path transverse to a path of travel of the elongated component; and applying heat and pressure to a film contacting an appropriate surface of the elongated building component by moving the head and supported drive roller into a heat and pressure applying position.

11. A method for applying a decorative material to an elongated building component comprising:

a) positioning multiple decorative film application stations for sequentially applying a decorative film to different application surfaces angled with respect to each other onto a choice of multiple different profile elongated building components as a selected one of the multiple different building components moves from one station to a next subsequent station;

b) maintaining a first inventory of different shaped drive rollers for moving elongated building components along a path through the film application stations and for applying heat and pressure to a decorative layer of an elongated film as the elongated building component moves through the multiple film application stations;

c) maintaining a second inventory of different shaped backing fixtures for supporting the building component having shapes based on a configuration of the component as the component moves through the film application stations;

d) presenting a user interface on a viewing monitor which allows a user to choose from a menu of different elongated building components during a set up of said multiple decorative film application stations; and e) in response to a user choice of the component, prompting the user to use a proper combination of a specific backing fixture and a specific drive roller oriented at a specific drive roller with respect to a path of building component travel for use at each of the multiple film application stations based on a particular building component chosen by said user.

* * * * *